S. R. BERGMAN.
DRIVING SYSTEM FOR AUTOMOBILES.
APPLICATION FILED MAR. 9, 1918.

1,378,514.

Patented May 17, 1921.

Inventor:
Sven R. Bergman,
by Albert G. Davis
His Attorney

UNITED STATES PATENT OFFICE.

SVEN R. BERGMAN, OF NAHANT, MASSACHUSETTS, ASSIGNOR TO GENERAL ELECTRIC COMPANY, A CORPORATION OF NEW YORK.

DRIVING SYSTEM FOR AUTOMOBILES.

1,378,514. Specification of Letters Patent. Patented May 17, 1921.

Application filed March 9, 1918. Serial No. 221,462.

*To all whom it may concern:*

Be it known that I, SVEN R. BERGMAN, a subject of the King of Sweden, residing at Nahant, in the county of Essex, State of Massachusetts, have invented certain new and useful Improvements in Driving Systems for Automobiles, of which the following is a specification.

The present invention relates to driving systems for automobiles of the type in which an internal combustion engine drives a generator connected to a storage battery, the generator and storage battery being connected in parallel to an electric motor or motors on the driving axles. In the operation of such systems the engine and generator are usually run at about constant speed and in case the generator supplies more power than the driving motor or motors require at the particular load, the excess is absorbed by the storage battery, while if the load becomes so great that the generator does not supply sufficient power, then the storage battery supplies the deficiency. Systems of this character are well known and the inherent advantages of them are well recognized.

One of the chief drawbacks to such systems has been that they have required large and heavy storage batteries which necessarily increase both the initial cost and the cost of operation.

The object of my present invention is to provide an improved system of this character which is automatic in control and which enables me to use a comparatively small storage battery.

For a consideration of what I believe to be novel and my invention, attention is directed to the accompanying specification and the claims appended thereto.

Figure 1:
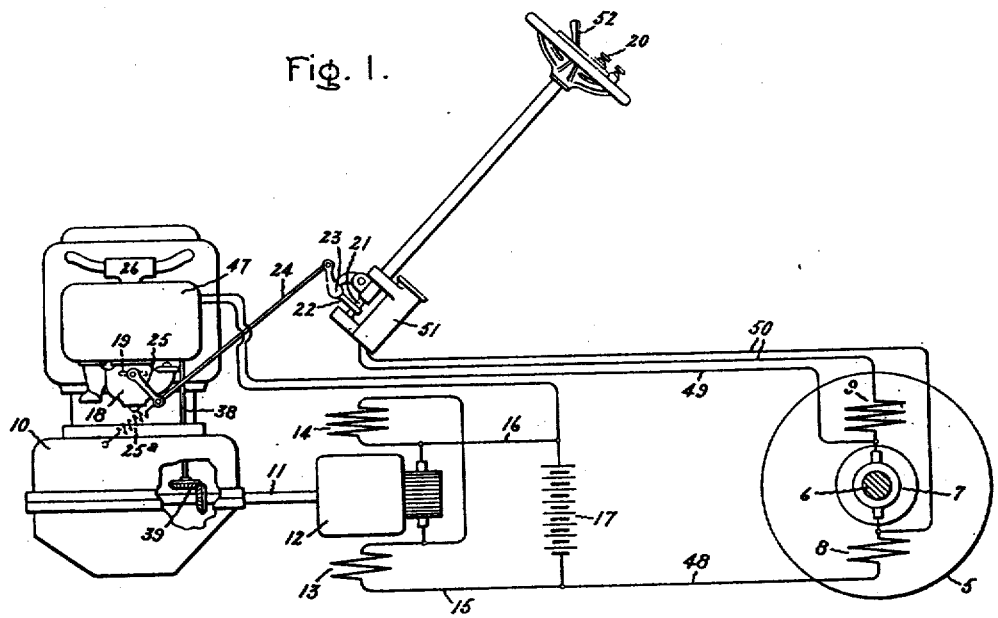
Figure 2:
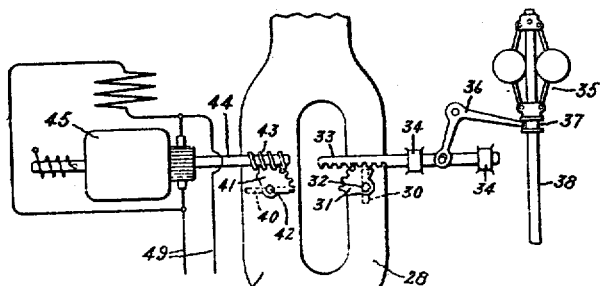
Figure 3:
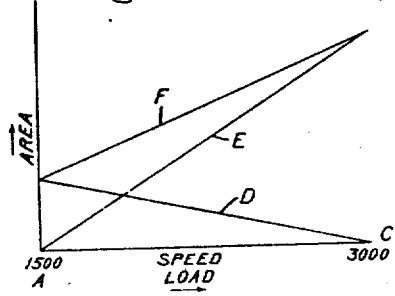

In the drawing, Figure 1 is a diagrammatic view illustrating my invention, Fig. 2 is an enlarged view of certain of the controlling parts, and Fig. 3 is a diagram which illustrates the operation of the invention.

Referring to the drawing, 5 indicates a wheel of an automobile, 6 a live axle and 7 a motor mounted on the axle 6 to drive it. The motor 7 is preferably a compound motor, 8, indicating the series field winding and 9 the shunt field winding. 10 indicates an internal combustion engine having its shaft 11 connected to the rotor of a generator 12. The generator is compound wound being provided with a series field winding 13 and a shunt field winding 14. Connected directly to the generator by conductors 15 and 16 is a storage battery 17. The internal combustion engine may be of any suitable type and is provided with a carbureter 18 in which is a throttle valve 19 controlled from a lever 20 on the steering wheel, as is usual. In the present instance the lever 20 turns a rod 21 in the steering post upon which is a cam 22 which engages a lever 23 connected by a rod 24 to the operating arm 25 of the valve 19. A spring 25$^a$ is provided to hold the lever 23 in engagement with cam 22. The manifold of the engine is indicated at 26 and the outlet of the carbureter is connected to it by a conduit 27 having two branches 28 and 29, as illustrated in Fig. 2. In branch conduit 28 is a throttle valve 30 having a toothed segment 31 on its spindle 32, and engaging segment 31 is a toothed rack 33 which slides in guides 34. Rack 33 is connected to a speed governor 35 by a bell crank lever 36 so that when the balls of the governor move the sliding collar 37, the bell crank lever moves the rack 33 and actuates the throttle valve 30. The shaft 38 of the speed governor is connected by gearing 39, Fig. 1, to the engine shaft 11 so that the throttle valve 30 is positioned according to the speed of the engine. In branch conduit 29 is a throttle valve 40 having a toothed segment 41 on its spindle 42 and meshing with segment 41 is a worm 43 on the shaft 44 of a load governor or load responsive device 45. In the present instance the load governor 45 is shown in the form of an electro-magnetic device responsive to the load current. In Fig. 1, the conduit 27, the speed governor 35, and associated parts, and the load governor 45 are shown as being inclosed in a suitable housing 47.

The generator 12 and storage battery 17 are connected in parallel to the motor 7 by conductors 48 and 49, the conductor 49 including also the load responsive device 45 so that it is in series with the motor 7. The device 45 will, therefore, position the throttle valve 40 in accordance with the load. The speed of the motor 7 is regulated by means of a suitable variable resistance connected in series with the shunt field 9 by conductors 50, and in Fig. 1, 51 indicates a suitable controller operated by a hand lever 52 on the steering wheel by means of which the shunt field resistance may be varied.

The operation is as follows:—When the engine is not running and the circuit of motor 7 is open the throttle valve 40 in branch conduit 29 is closed, and the throttle valve 30 in branch conduit 28 is open. These are the positions in which the valves 40 and 30 are shown in Fig. 2. When the engine 10 is running and the motor circuit is closed so that the automobile is in motion the speed governor 35 acts in a direction to close the valve 30 and the load governor 45 acts in a direction to open the valve 40. The speed governor is preferably set so that it does not come into action until the engine is well started, for example, at 1500 R. P. M. The branch conduit 28 is preferably smaller than the branch conduit 29 and the valve 30 is moved from wide open position to closed position during a certain range of operation. It may be fully open up to and at 1500 R. P. M. as referred to above, and fully closed at some higher speed, for example, 3000 R. P. M. The electro-magnetic device 45 is arranged to gradually open the valve 40 as the load increases. It will thus be seen that a differential action takes place upon changes of load and speed and the arrangement is such that at any time the resultant total valve opening; that is, the sum of the openings of valves 30 and 40, is always proportional to the total load. This is illustrated diagrammatically in Fig. 3 where the vertical line A B represents area of valve opening and the horizontal line A C represents speed in the case of valve 30 and load in the case of valve 40. The line D indicates the area of valve opening of valve 30 for a certain range of speeds, to use the example previously referred to, of from 1500 R. P. M. to 3000 R. P. M. for example; the line E indicates the area of valve opening of valve 40 for a certain range of load, for example from no load up to full load, and the line F indicates the sum of the areas indicated by lines D and E; i. e., F=D+E.

It will be appreciated, of course, that the engine is at all times under the control of manually actuated valve 19, which valve is in series with valves 30 and 40, and in advance of them as regards the direction of flow.

With this arrangement when the automobile is running along on level ground the engine will be maintained at substantially constant speed and the speed of the automobile can be regulated by the controller 51. The storage battery 17 floats on the line and may be charging, or if fully charged, idle or discharging slightly according to circumstances. In case of an increase in load such, for example, as would be met with upon striking a grade, the load governor, due to the increase in load, will act to open up the throttle valve 40 and increase the engine speed, causing the generator to furnish a greater or less portion of the extra power required so that it will not all be thrown on the storage battery 17. The generator 12 is electrically designed to give a slightly rising potential with the speed. For example, it may be so wound that at double the normal speed the generator current will be double the normal output. With this arrangement, therefore, the battery 17 will be always protected automatically against heavy overloads and hence its size need not be great. At the same time the arrangement renders the operation and control of the automobile very simple.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

1. In a system of the character described, the combination of an engine, a generator driven thereby, a storage battery, a motor connected to the generator and battery, a conduit having two branches through which operating fluid flows in parallel to the engine, a valve in one of said branches which is normally open and is moved toward closed position when the speed of the engine increases, a valve in the other branch which is normally closed and is moved toward open position when the load increases, and a manually controlled valve in said conduit in series with and in advance of said first named valves as regards the flow therethrough.

2. In a system of the character described, the combination of an engine, a generator driven thereby, a storage battery, a motor connected to the generator and battery, a conduit having two branches through which operating fuel flows in parallel to the engine, a valve in one of said branches which is normally open and is moved toward closed position when the speed of the engine increases, said valve remaining fully open until a predetermined speed is reached, and a valve in the other branch which is normally closed and is moved toward open position when the load increases.

In witness whereof, I have hereunto set my hand this sixth day of March, 1918.

SVEN R. BERGMAN.